April 26, 1938. D. PERLMAN 2,115,280
TIME CONTROL DEVICE
Original Filed Aug. 30, 1934   4 Sheets-Sheet 1
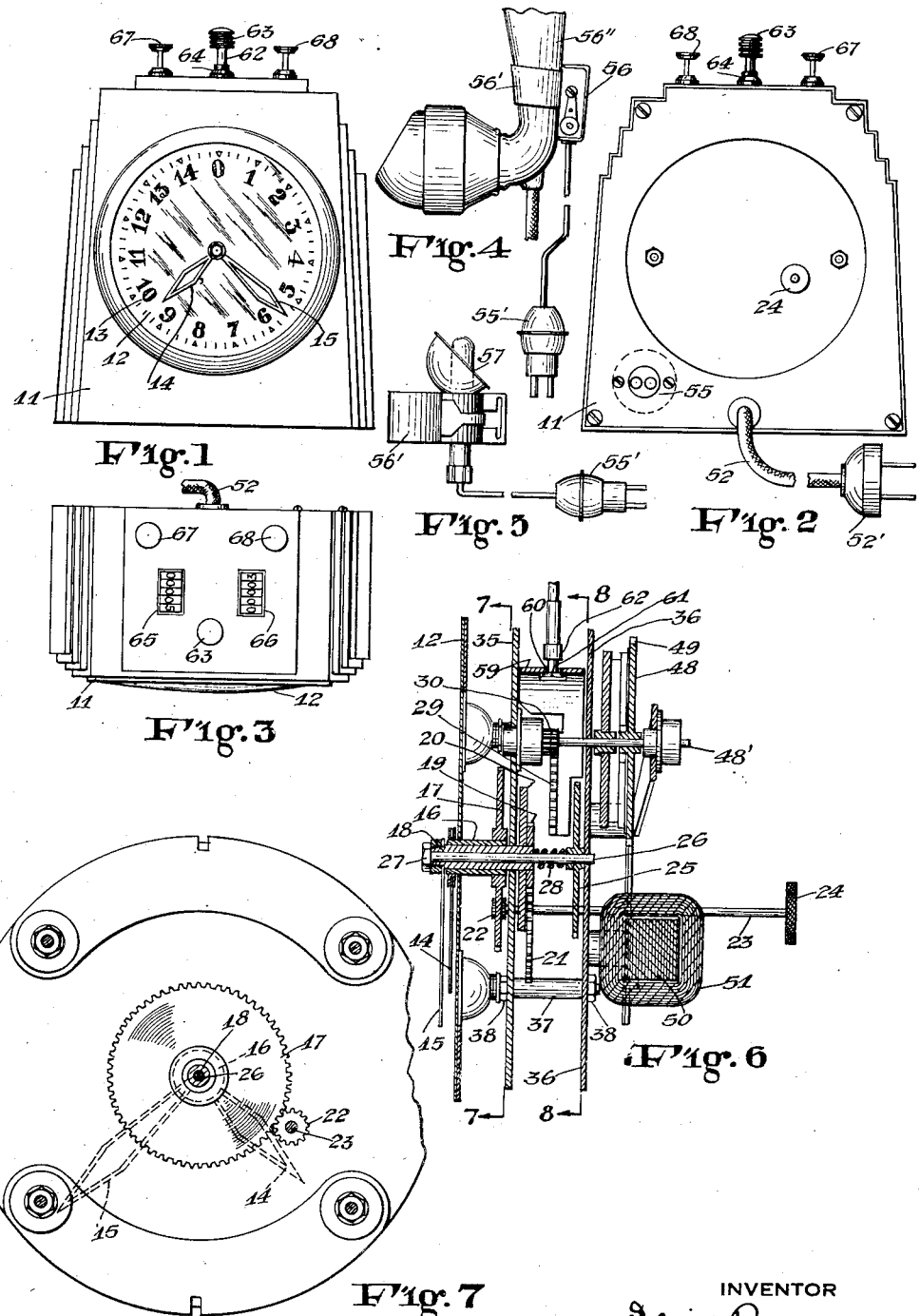
INVENTOR
David Perlman April 26, 1938.  D. PERLMAN  2,115,280
TIME CONTROL DEVICE
Original Filed Aug. 30, 1934  4 Sheets-Sheet 2
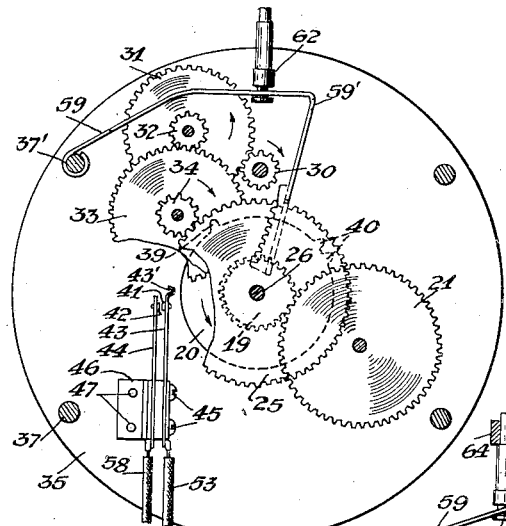
Fig. 8
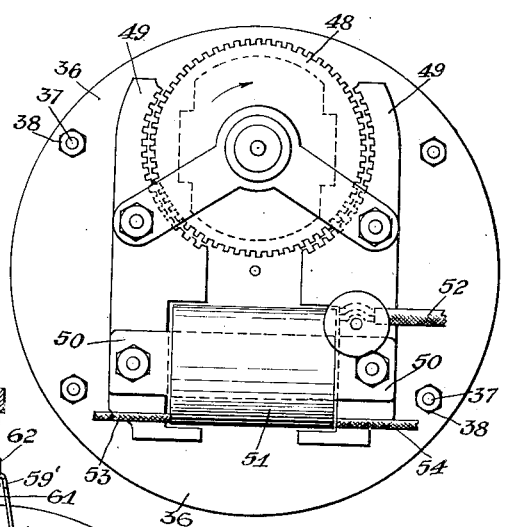
Fig. 9
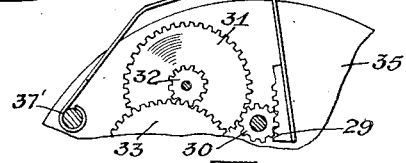
Fig. 10
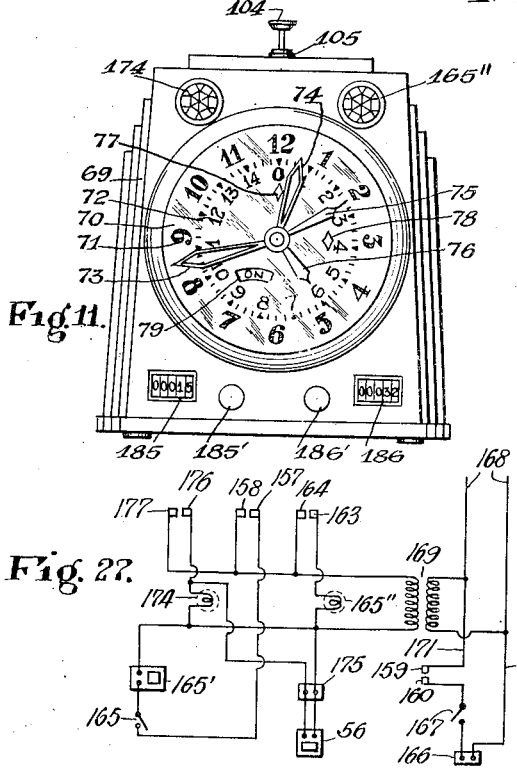
Fig. 11
Fig. 27.
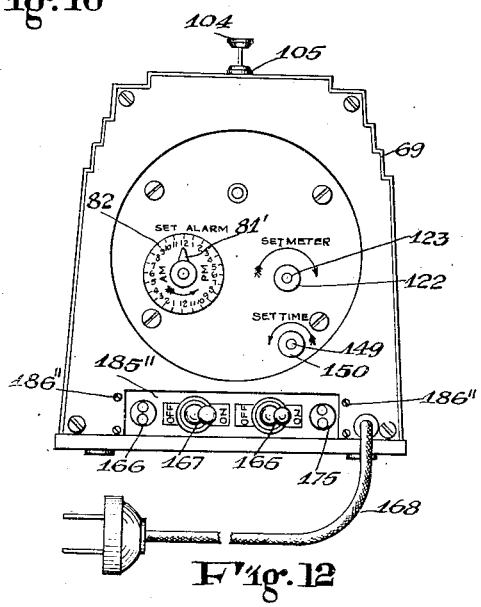
Fig. 12
INVENTOR
David Perlman.

April 26, 1938. D. PERLMAN 2,115,280
TIME CONTROL DEVICE
Original Filed Aug. 30, 1934  4 Sheets—Sheet 3
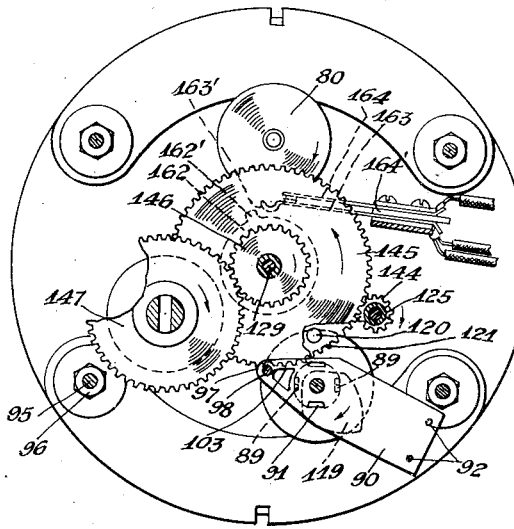
Fig. 14
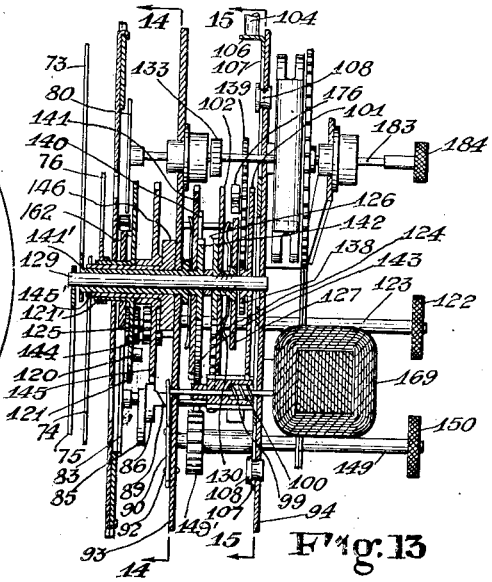
Fig. 13
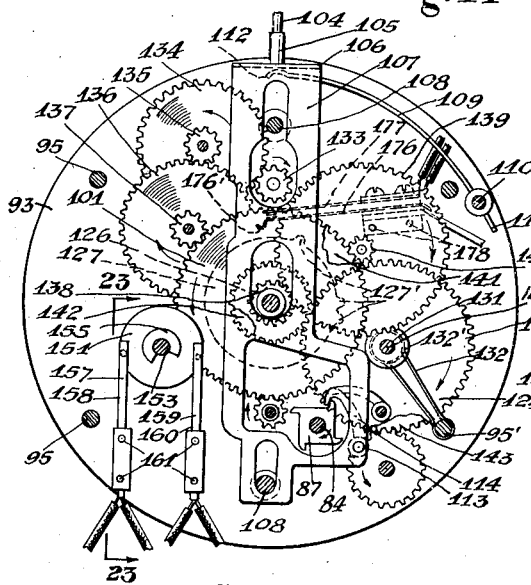
Fig. 15
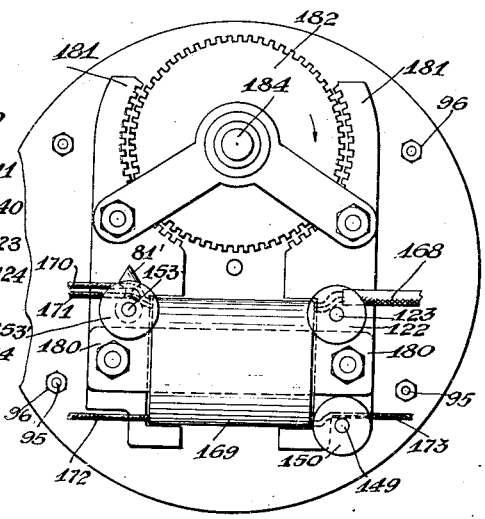
Fig. 16
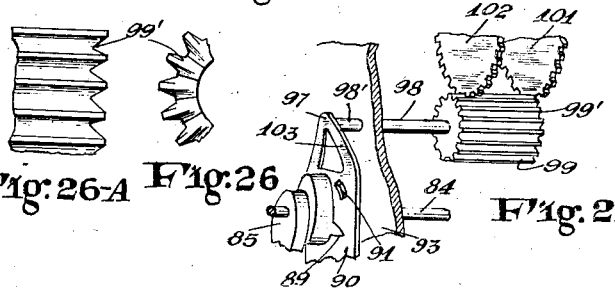
Fig. 26-A  Fig. 26  Fig. 21-A
INVENTOR
David Perlman

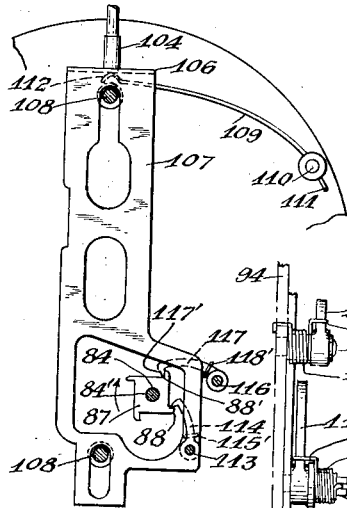
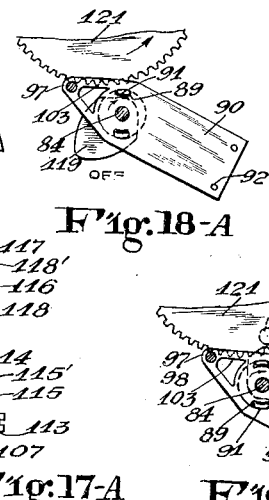
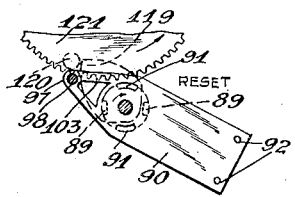
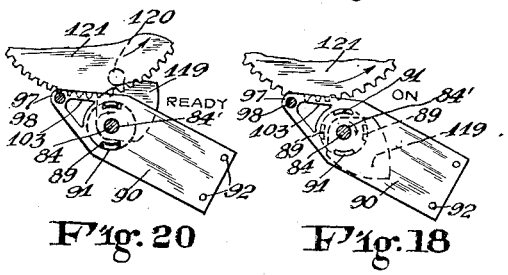
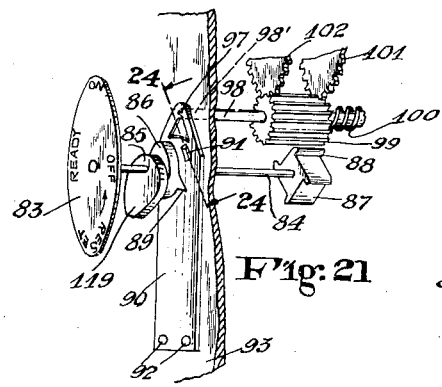
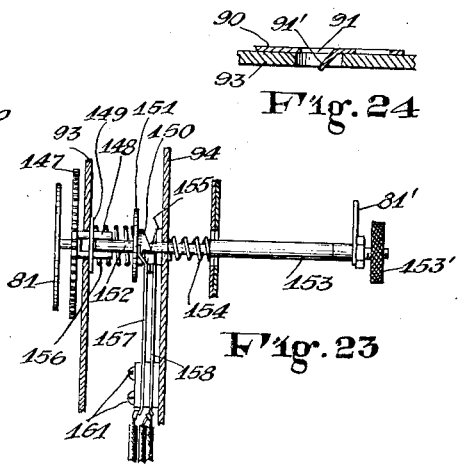
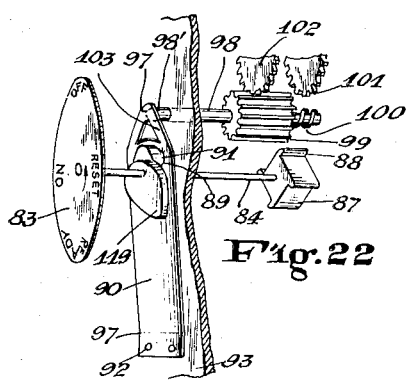
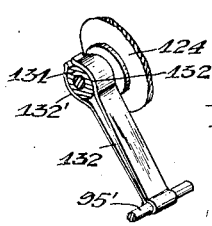

Patented Apr. 26, 1938

2,115,280

UNITED STATES PATENT OFFICE 2,115,280

TIME CONTROL DEVICE

David Perlman, New York, N. Y.

Application August 30, 1934, Serial No. 742,044
Renewed September 7, 1937

9 Claims. (Cl. 161—19)

My invention relates to time operated and controlling devices and methods for operating the same and more particularly as applied to telephone and similar signalling systems with a view to checking and controlling the time of a conversation or other signalling transmission.

One of the objects of my invention is to provide novel means and a method for reducing the telephone bills to the subscribers by providing a suitable time meter to be set in operation upon the beginning of a telephone conversation or other signalling transmission and to audibly or visually apprise the telephone user of every full minute or any other pre-arranged time period the telephone is in use.

The usual charges for telephone calls are for a definite period which when exceeded will require payment of the full succeeding period even if the over-time amounts only to a fraction of such period. Thus, for example, from New York to Los Angeles the first three minutes of a telephone call cost $8.75 and every additional minute $2.75. The telephone companies allow twelve seconds over-time on such calls. If the party using the telephone continues his conversation one second above the allowed over-time of twelve seconds, he has to pay an additional $2.75; that is, the minimum charge for a full minute for actually using the telephone for one second only.

Similarly, the rate for local calls, for instance, is five cents for five minutes talking time with an allowed free over-time of six seconds. If the party continues the conversation for one second; that is if his call lasts five minutes and seven seconds, he is charged for a full additional call for actually using the telephone one second only.

Accordingly it is a further object of my invention to provide means for apprising the telephone user in due time to close his conversation within the allowed limit and the permissible free over-time or any other pre-arranged minimum time period, such as by warning him in a suitable manner, say about 15 seconds before the expiration of the full minute in the example above given, and to enable him to close his conversation and avoid paying the rate for the full period for actually using a fraction thereof.

In this manner, as is obvious, great savings are secured on the part of the telephone subscribers.

Another object of my invention consists in the provision of a novel and simple method and means for transmitting signalling impulses, such as warning signals or the like, over an electric telephone channel superimposed upon the ordinary signalling currents such as speech or similar signalling currents.

A further object of my invention consists in the provision and adaptation of a signalling unit to a telephone set to apprise or warn the subscribers on both sides of the line.

A still further object of my invention is the provision of a combined time meter and/or control device structurally embodied in and cooperatively associated with an ordinary clock and provided with a single means for readily and easily engaging and disengaging the telephone meter mechanism from the clock movement to make a desired time measurement and/or to effect a control operation within a desired time period.

Another object of the invention consists in the provision of a simple means for resetting the time meter device in a combined meter and clock mechanism to zero position after completion of a metering operation.

Another object of the invention is to provide indicating means in particular in connection with a combined clock and an intermittently operable time meter device to indicate the condition of the meter such as, for instance, whether the meter is ready to be started, when it is in operation, when it is stopped for taking the time reading, and when it is in its reset condition to be returned to its initial position ready for a new operation.

Still a further object of the invention is the provision of a combined time operated and/or controlling device and clock, preferably an electric clock with an alarm or time operated mechanism suited for ringing an alarm at a predetermined set time to remind the telephone user or subscriber to any other service of an appointed telephone call or any other appointment as may be desired.

Another object of the invention is the provision of an intermittently operable time meter and/or control device combined with a clock in which the time meter device may be simply and easily returned to its initial or zero position or adjusted during operation; that is, while in engagement with the clock mechanism.

Another object of the invention is the provision of a time meter and/or control mechanism driven by a synchronous electric motor which may be readily and easily started and stopped for making a time measurement and/or effecting periodic control operations within desired periods.

A more specific object of my invention is the provision of a combined time operated and indicating device and clock mechanism by means of which a telephone user or subscriber to any other service is easily and readily informed that a limited time period is about to expire, for instance, in such a manner that periodic warning signals continue over a pre-arranged period and that during the last minute of such period a light or other suitable signal apprises the user or operator of the proper time to close his conversation without unduly paying for excess time over the pre-arranged minimum period.

Another object of my invention is the provision of a time control and/or measuring device and a method of operating same enabling a telephone subscriber or subscriber to any other service to start the meter at the beginning of the telephone or signalling period and to stop it at the completion of his conversation, by performing a single and unique operation for both starting and stopping the meter and/or resetting it to its initial or zero position in such a manner as to prevent any confusion on the part of the user as to the operations to be performed.

A further object of the invention is the provision of a plurality of individual manually independent mechanisms adapted to be engaged and driven from a single prime mover whereby interference due to frictional engagement in the normal position is substantially prevented.

Still a further object of my invention is to provide a time operated meter mechanism controlling more than one signalling device.

Further objects and aspects of the invention will appear hereinafter. My invention consists in the various features of construction and the arrangement of parts and methods of operation as described hereinafter and as shown in the drawings illustrating preferred forms of both a single meter and a combined meter and clock mechanism and of which Fig. 1 is a front view of a single meter according to the invention.

Fig. 2 is a rear view of the meter according to Fig. 1.

Fig. 3 is a top view of the meter according to Fig. 1.

Fig. 4 is a fragmentary view of a telephone receiver showing a warning signal device such as a buzzer operated by a meter as shown in the previous figures in clamped position.

Fig. 5 is a front view of a signalling lamp to be used in place of a buzzer.

Fig. 6 is a vertical cross section through the meter movement of Fig. 1.

Fig. 7 is a vertical section across section line 7—7 of Fig. 6.

Fig. 8 is a vertical section across section line 8—8 of Fig. 6 in operative position.

Fig. 9 is a rear view of the meter according to Fig. 1 with cover removed.

Fig. 10 is a fragmentary section similar to Fig. 8 showing the motor starting lever in zero position.

Fig. 11 is a front view of combined clock and time meter such as a telephone call meter.

Fig. 12 is a rear view of the meter shown by Fig. 11.

Fig. 13 is a vertical cross section of the movement of the meter shown in Fig. 11.

Fig. 14 is a vertical section across section line 14—14 of Fig. 13.

Fig. 15 is a vertical section across section line 15—15 of Fig. 13.

Fig. 16 is a rear view of the combined clock and meter movement shown by Fig. 13.

Figs. 17, 17A, 18, 18A, 19, 20, 21, 21A and 22 are fragmentary skeleton views partly in perspective illustrating the starting, stopping and resetting mechanism of the meter and/or control device shown by Figs. 11 to 16.

Fig. 23 is a vertical section across section line 23—23 of Fig. 15.

Fig. 24 is a fragmentary view across section line 24—24 of Fig. 21.

Fig. 25 is a fragmentary view in perspective of mechanism to prevent interference between the clock and meter gear trains.

Figs. 26 and 26A are enlarged fragmentary views of coupling pinion 99' with the especially tapered teeth ends to insure ready engagement with its cooperating gear in any position.

Fig. 27 shows the wiring diagram of the circuit connections in the device described by Figs. 11–26A.

Similar reference numerals identify similar parts throughout the different views of the drawings.

Referring more particularly to Figs. 1 to 10 illustrating a single meter mechanism in accordance with the invention, I have shown a case 11 (Fig. 1) provided with an opening for a dial 12 with numerals 13 over which travel the meter hands 14 and 15. The hand 14 is mounted on hub 16 of gear 17 (Fig. 6) and the hand 15 is mounted on hub 18 of pinion 19 carrying a cam 20 of electrically insulating material. I have furthermore shown a stem 23 terminating with an operating knob 24 for manually resetting the hands 14 and 15. This stem carries a gear 21 and a pinion 22, both of which are in meshing engagement, respectively, with the pinion 19 and gear 17 of the hubs 18 and 16 which latter carry the hands 15 and 14. In this manner the first part of the gear train is completed which is frictionally connected to the remainder of the gear train by means of the spring 28 carried on shaft 26 of gear 25. The hub 18 is loosely mounted and frictionally engaged with shaft 26 by being compressed with nut 27 against one end of spring 28 which presses with its other end against the hub of gear 25 thereby frictionally connecting the two gear trains in such a manner as to allow setting of the meter hand by means of knob 24 independent of the remainder of the meter movement. The remainder of the meter gear movement comprises the rotor pinion 30 on the shaft of the driving motor (Fig. 8) driving the gear 31 carrying a pinion 32. The pinion 32 drives the gear 33 with its pinion 34, and the pinion 34 drives the gear 25 with its spring 28 engaging the rest of the gear train, as described hereinbefore.

The motor may be of any type, but is preferably a manually startable reluctance type motor well known in the art, preferably as disclosed in my U. S. Patent No. 1,913,948 issued June 13, 1933. The motor is normally connected to an alternating current supply line and is in inoperative locked position as shown in the fragmentary view of Fig. 10 with its pinion teeth engaged with the teeth 29 of a starting member such as a rack ratchet lever 59.

The entire movement is mounted in and to a frame comprising two plates 35 and 36 with four bracing pillars 37 and 37' assembled by means of a screw and nut connection 38 as shown, or the like.

The electrically insulating cam 20 is provided for operating electric switch comprising switch springs 43 and 44 with contacts 41 and 42, respectively. For this purpose the cam has a first projection or tooth 39 and in addition a pair of further teeth 40 displaced from the first tooth at a definite distance as shown (Fig. 8). The cam makes one revolution during a predetermined period such as during one minute, and with its teeth 39 and 40 moving in the path of switch finger 43' of switch spring 43 the former is compressed and its contact 41 closes with contact 42 of the other switch spring 44. This switch is held by screws 45 to angle bracket 46 which is secured to plate 35 by screws 47.

The rotor 48 is magnetically energized by stators 49 (Fig. 9) bridged by a core 50 carrying a winding coil 51. The coil 51 is energized through a flexible wire conductor 52 with alternating current from a suitable source such as an electric power supply line, in a manner well known.

The coil 51 is further provided with a low voltage secondary winding terminating with leads 53 and 54 for supplying low voltage current for operating the signalling or indicating devices, as will be described hereafter. Lead 53 is connected to switch spring 43 and lead 54 connects through a separable connecting plug 55 and 55' to a signalling or any other translating device such as in the example shown a buzzer 56 or a lamp 57 (Figs. 2, 4 and 5). From the lamp or buzzer a return lead runs through the connecting plug 55', and back through connecting plug 55 to terminate in lead 58 connected to switch spring 44, thus completing the electrical circuit from the supply winding through the switch contacts and the indicating signal device. As is understood any other signalling or translating device may be provided and inserted in the circuit in place of a buzzer or lamp as shown, or alternatively several devices may be simultaneously employed such as for producing both visual and acoustic warning signals.

The buzzer 56 carries a pair of metal spring clips 56', and the lamp carries similar clips 56' suitably formed to clamp on to the telephone receiver or transmitter 56". In this manner the buzzing noise or similar acoustic signal is transmitted to the other end of the line in an easy and simple manner by superimposition upon the regular telephone signalling impulses and commands attention of the telephone users on both ends of the line regardless of the nature of the conversation and warns them with one short buzzing that a definite period, in the example shown about ¾ of a minute (dependent on the position of the teeth 39 and 40, respectively) expired and that there is only 15 seconds left over to close the conversation. Upon the expiration of 58 seconds that close before the lapse of the complete minute the meter warns the telephone users again with two short buzzing signals produced by teeth 40 that the full minute is about to expire and that they may close the telephone shortly, taking advantage of the allotted free overtime and avoid undue charges. Thus, as long as the meter operates, it signals every 45 seconds of a minute and every minute.

On plate 35 over its left hand upper pillar 37' there is pivotally mounted a bent ratchet lever or rack 59 having a slot 60 for sliding engagement with neck of plunger head 62 and for clearance of gear 31. The slot 60 widens with right-angular key slots at 59' to permit entering of and engagement with collar 61 of a plunger head 62 (Fig. 6). This plunger terminates with knob 63 through sleeve 64 of case 11 (Fig. 1). The plunger with the lever engaged normally is in uppermost position as shown in Fig. 10. The lever 59 at its lower end carries a series of teeth 29. The lever teeth 29 mesh with the teeth of rotor pinion 30 for starting and stopping the motor.

The starting and stopping of the meter is effected in the following manner:

To start the meter, the knob 63 is pressed all the way down. This motion forces the lever downward, and being engaged with its teeth 29 to pinion 30 of the rotor 48, a starting impulse is imparted to the motor whereby the motor starts running. And with further lowering of the lever 59 its teeth 29 disengage from the pinion 30, thus permitting the motor to drive the gear train and the meter hands. To stop the meter, the knob 63 is again raised as far as it will go. This motion raises the lever 59 and with its teeth 29 meshing again with the teeth of pinion 30 in the opposite direction the motor will be stopped. To reset the hands of the meter to zero position again, knob 24 in the back of the meter is turned manually.

As is seen, a device as described affords an easy measurement and checking of the period of a telephone call or any other desired time period by periodically warning the user or operator at definite intervals enabling him to arrange to terminate his call at such periods as will result in substantial savings in his telephone bills.

Registering counters 65 and 66 (Fig. 3) may be provided, one for registering local calls and the other for registering long distance calls. The counters are operated by plungers 67 and 68.

Referring to Figs. 11 to 26A, inclusive, disclosing a combined clock and meter device, I have shown at 69 (Figs. 11 and 12) a casing with an opening for a dial 70 provided with two circular rows of numerals 71 representing the conventional clock numerals, and 72 representing the meter numerals, the latter being arranged within the former, as shown. Two sets of hands are traveling over this dial. The ordinary clock hands 73 and 74 serve for indicating time on the clock numerals 71 while the hands 75 and 76 of smaller size serve for indicating the time on the telephone meter numerals 72. The dial 70 has two diamond perforations 77 and 78 and a semicircular perforation 79. The perforation 77 indicates by means of a revolving multi-colored flasher disc 80 (Figs. 13 and 14) that the motor driving the clock gear train is running. Through the perforation 78 a similar dial 81 is visible connected to the alarm setting knob 153' and serving to indicate the setting of the alarm hand 81' on the dial 82 arranged on the back of the meter (see Fig. 12). The semi-circular perforation 79 serves to show the four relative positions of an indicating disc 83 (Figs. 21–22) of a mechanism adapted to engage and disengage the telephone meter gear train from the continuously running clock gear train. For this purpose I have shown the dial 83 provided with four diametrical markings; "Ready", "On", "Off", and "Reset" (Figs. 13, 21 and 22). This dial is mounted on a shaft 84 carrying a pair of cams 85 and 86 and a ratchet wheel 87 provided with four teeth 88. The cam 86 has two diametrically opposed tapered projections 89 (see also Figs. 18–20) for pressing down a flat spring 90 when it rides on the flat surface of the spring as shown in the position according to Fig. 21 and for releasing the spring 90 when the projections 89 trip in the diametrical tapered perforations 91 of the spring as shown in the position according to Fig. 22. The spring 90 is riveted to frame plate 93 by means of rivets 92. Plates 93 and 94 are joined by pillars 95 and 95' by means of screws and nuts 96 (Figs. 14, 16) and comprise the main frame of the combined clock and meter mechanism. The spring plate 90 is bent at 97 (Fig. 22) several degrees away from the face of plate 93, and is normally in this position when not compressed by the cam projections 89. This spring has an opening 84' (Figs. 18–20) for allowing passage of shaft 84. The perforations 91 have the sheared stock 91' bent to the same angle as the tapered projections 89 of cam 86 as shown in enlarged fragmentary cross-sectional view by Fig. 24. This provides a smooth bearing surface for the cam projections 89 to ride out of the perforations 91 when the cam is rotated by the ratchet wheel 87 as will be described hereinafter and thereby to compress the spring 90 toward the face of plate 93. With the spring extreme end 97 abutting against the projecting end of shaft 98, it forces the shaft with its pinion 99 to shift and compress the spring 100 mounted on the other end of shaft 98, and pressing with one end against pinion 99 and with the other end against the inner face of plate 94 (Fig. 13). This movement causes the teeth of pinion 99 to engage with the teeth of gear 101 driven by the clock gear train whereby the time meter is started to operate by coupling with the continuously running clock gear train. The shifting pinion 99 is in constant meshing engagement with gear 102 of the meter gear train, and thus, by its engagement or disengagement with gear 101, it starts or stops the meter gear train. Fig. 21 shows the meter gear train engaged with the clock gear train, as a result of the spring 90 being compressed by the cam projections 89. Fig. 22 shows the gear trains in disengaged position from each other, as a result of the cam projections 89 being tripped in the spring perforations 91 of spring 90, thus releasing the spring end 97 and allowing it to move away from the face of plate 93 and in turn release the shaft end 98' with its pinion 99. The latter is therefore shifted back by the pressure of its spring 100 and is disengaged from the clock gear 101.

The spring 90 is cut out at its extreme end 97 to provide flexible joined ribs 103 insuring sufficient resiliency to prevent jamming of gears and stalling of the motor upon starting of the meter, when the pinion 99 and gear 101 with their teeth are aligned in non-aligned position as shown in Fig. 21A. In this position, with the spring 90 compressed by cam projections 89, the resiliency of ribs 103 permits its end 97 to flex gently against the end 98' of shaft 98 and with its pinion teeth pressing gently in a non-engaged position against the teeth of gear 101, thus permitting the gear 101 to advance to a meshing alignment position with pinion 99 and then to snap in engaged position as shown in Fig. 21. As is understood the end of spring 90 engaging the end of shaft 98 may be given greater resiliency than the remaining parts of the spring to insure smooth engagement and disengagement of the gear trains, in any other manner different from the arrangement as shown of slotting the engaging spring end portion. Thus, the end of the spring may consist of different more flexible material than the main part of the spring and suitably connected to the main spring portion, as will be readily understood. Figs. 26 and 26A show in enlarged form fragmentary views of the pinion 99 taken on the engagement end, which shows the teeth ends milled especially tapered in accordance with a further feature of the invention, to facilitate easy and positive teeth engagement between pinion 99 and gear 101.

When in engaged position, both gear trains are connected and meshed into one gear train and all the four hands move over the dial in their respective order.

In the example shown the clock hand 73 makes one revolution per hour, the clock hand 74 makes one revolution in twelve hours, the meter hand 75 makes one revolution per minute, and the meter hand 76 makes one revolution in fifteen minutes.

The starting or stopping of meter gear train is carried out manually by one and the same operation such as by pressing down (once only for each operation) a plunger 104 carried by a sleeve 105 mounted on case 69 (Figs. 15, 16 and 17). The inner end of plunger 104 abuts against the right angular abutment 106 (Fig. 13) of a slide 107 carried by plate 94 by means of slots engaging with two suitable studs 108 mounted to plate 94. This slide is normally held in its upper position as shown in Fig. 15 by means of a spring 109 pressing upward with its end 112 against the abutment 106 of the slide 107. This spring is mounted on plate 94 by a split rivet 110 and is anchored in the plate at 111. The slide 107 carries a stud 113 (Figs. 17 and 17A) with a pawl 114 and a spring 115 with its inner end 115' pressing against the said pawl. The pawl is constantly engaged with one of the four teeth 88 of the ratchet wheel 87 (Figs. 17, 21 and 22). Each time the slide 107 with its pawl 115 is pressed downward to the position shown in Fig. 17, it turns the ratchet wheel 87 over one quarter of a revolution together with its shaft 84 and cams 85 and 86 with its teeth projections 89. As a result thereof the spring 90 is compressed or released in turn resulting in pressing in or releasing of the sliding shaft 98 with its shifting pinion 99. The latter in turn meshes in or slides out of engagement with gear 101 of the main clock gear train. A second stud 116 (Fig. 17A) mounted to plate 94 carries a second pawl with a spring 118 which presses with its outer end 118' on pawl 117 to force its tooth 117' to trip and overlock the tooth 88' as it turns over, in order to prevent the ratchet wheel 86 from turning backwards, by the pressure of the pawl 114, when it slides upwards upon returning to its normal position together with the slide 107.

Mounted on the cam 86 there is a further cam 85 with an eccentric extension 119 arranged for turning over the cam 86 with its entire assembly one quarter of a revolution when the meter is in the "reset" position in order to stop the meter gear train automatically, when the meter hands approach the zero position. This cam is timed with pin 120 of the meter gear 121 (Fig. 19). The gear 121 carries on its hub 121' the hand 76 of the time meter mechanism. The gear 121 turns in the direction indicated by arrow and with its pin 120 abutting against the extreme end of cam 119 will force it with its entire assembly to turn over to the position shown in Fig. 20, which trips the cam projections 89 in the spring perforations 91, thus automatically stopping the meter with its hands in the zero position of the meter and with its indicating dial showing "Ready" for the next operating cycle.

Figs. 18, 18A, 19 and 20 more clearly illustrate the four successive positions of the ratchet wheel 87 and its associated cams 85 and 86. The "on"

or starting position (Fig. 18), the "off" or stopping position (Fig. 18A) and the "reset" position (Fig. 19) all being effected manually by a single unique operation such as by successively pressing down each time the plunger 104 as illustrated, while the fourth or "ready" position is effected automatically during the "reset" condition by means of pin 120 of gear 121 associated with the meter movement and in cooperation with the cam 85 by which as described the meter is automatically returned to its initial or starting position and is ready for renewed operation.

I have furthermore shown the meter provided with additional means for manually and independently resetting or adjusting the meter hands similar as described in connection with the single time meter shown by Figs. 1 to 10 comprising a knob 122 (Fig. 13) mounted to a rod 123 which carries a gear 124 (Fig. 15) and a pinion 125 (Figs. 13 and 14). The gear 124 meshes with pinion 126 (Fig. 15) of the insulating signalling cam 127 similar to cam 20 as described in Fig. 8 and revolving once each minute, and the pinion 125 (Fig. 14) meshes with gear 121 carrying on its hub 121' the meter minute hand 76.

The seconds signalling cam 127 is mounted with pinion 126 on shaft 129 carrying the meter seconds hand 75. The shaft 129 carries also the gear 102, which is loosely mounted, and is frictionally engaged by spring 130 (Fig. 13) to pinion 126. This frictional arrangement provides the possibility for independent adjustment of the meter hands, while the meter gear train is engaged with the clock gear train. This permits the meter gear train and hands to be turned by knob 122 in either direction at any time.

However, since the meter gear train and the clock gear train are in constant frictional engagement due to the concentric mounting of the meter and clock hand shafts as described, there is a constant danger of the meter being taken along by the running clock movement, even if both are disengaged by the proper position of the pinion 99. In order to prevent this, I have further shown the gear 124 (Figs. 15 and 25) carrying a drum 131 which is frictionally engaged in both curved open ends of a spring 132'. The closed end of the spring 132 is anchored to the stud 95'. This friction drum functions to hold the meter gear train and hands in constant stationary position when it is disengaged, thus preventing the meter hand shafts from being carried along by the friction of the hand shafts of the clock concentrically arranged one within the other. As is understood the friction produced by the spring 132 must be such as to prevent a carrying along of the meter gear train by the running clock gear train; that is it must be greater than the friction between the respective shafts of both gear trains and it has to be small enough on the other hand to be easily overcome by the driving force of the motor or other prime mover when both trains are in their engaged positions.

The clock gear train runs in the following order (Fig. 15): The rotor pinion 133 drives the gear 134 with its pinion 135. The pinion 135 drives the gear 136 with its pinion 137. The pinion 137 drives the gear 101 with its pinion 138. Pinion 138 drives the gear 139 with its pinion 140. The pinion 140 drives the gear 141 with its pinion 142. The hub 141' (Fig. 13) of gear 141 carries the clock minute hand 73. The pinion 142 (Fig. 15) drives the gear 143 with its pinion 144 (Fig. 14). Pinion 144 drives gear 145 with its pinion 146. The hub 145' of gear 145 carries the clock hour hand 74. The pinion 146 drives the twenty-four hour alarm coupling gear 147.

Meshing with gear 143 is a pinion 149' (Fig. 13) carried on rod 149 terminating with a knob 150 for manual resetting of the clock hands 73 and 74, in a manner similar as described hereinbefore.

The alarm set-off gear 147 is mounted on a female coupling 148 (Fig. 23) bearing through the plate 93 and held in position by washer 148'. A cam 155' with an insulating disc 151 is mounted on the male coupling 152 which is loosely carried on the inner part of rod 153. This rod terminates with a knob 153'. The rod 153 is frictionally engaged through plate 94 by spring 154 and cam 155. A spring 156 is carried over both parts of the coupling to force the cam 155' against the other cam 155 to trip off upon reaching the predetermined time set by hand 81' over dial 82, and with its insulating disc 151 pressing against the switch springs 157 and 159 closes both switches. Switch 157 and 158 closes the circuit for the alarm buzzer 165' inside of the meter (see Figure 27). This buzzer is controlled by switch 165 (Fig. 12).

The switch 159 and 160 closes a power supply circuit to light up a lamp or turns on any other electrical device such as a radio set which plugs into connector 166 (Fig. 12). This circuit is controlled by switch 167. The connecting cord 168 energizing the coil 169 continues with leads 170 and 171 for wiring the outlet 166 described above.

The coil 169 is wound with a secondary terminating with leads 172 and 173 for energizing selectively the buzzer inside of the meter, or the signalling buzzer 56 or lamp 57 and the bull's eye 174. It also energizes the time expiration signalling bull's eye 165". The outlet 175 is provided for connecting with buzzer or lamp connectors 55'.

The meter gear train runs and signals in the following order: When in engaged position, the clock train gear 101 drives the pinion 99. The pinion 99 drives the gear 102 with its pinion 126. The shaft 129 of gear 102 carries the meter seconds signalling cam 127 and the hand 75. The pinion 126 drives the gear 124 (Fig. 15) with its pinion 125 (Fig. 14). The pinion 125 drives the gear 121 with its period expiration signalling cam 162. The insulating signalling cam 162 has a raised section 162' for engaging and raising the switch finger 163' of switch 163 to close the circuit through its opposing contact 164. This switch is mounted to plate 93 by angle bracket 164'. This switch functions to close a circuit for a visual signal light, for instance, bull's eye 165" for a minute to warn the telephone user that a predetermined time period is expiring and that the last part of the period, for instance, 60 minute, is on during which to close the conversation.

The insulating cam 127 (Fig. 15) with its raised teeth 127' while revolving and passing raises the switch finger 176' of switch 176 and closes it with its opposing contact 177 which closes the circuit and energizes selectively the buzzer in the meter or the buzzer 56 or light 57 in addition to the bull's eye 174 for signalling each forty-five seconds one signal and each minute two signals. This switch is mounted to plate 93 with screws 178.

The meter is electrically energized with alternating current by coil 169 (Fig. 16) and with its core 180 bridged across stators 181 energizes magnetically the rotor 182 mounted on shaft 183 which carries the pinion 133 for driving the gear train as described. This rotor is started manually by spinning the knob 184.

The registering counters 185 and 186 with their operating plungers 185' and 186' are provided, one for registering local and the other for long distance telephone calls.

An insulating terminal block 185" secured with screws 186" against the inside rear wall of case 69 carries the outlet connectors 166 and 175 with the switches 165 and 167.

It will be understood that the above description and accompanying drawings are to be regarded as illustrations only of the novel features and methods of my invention which, as is obvious, permits of various modifications and variations in the construction and arrangements of parts in accordance with the underlying spirits of the invention and within the scope thereof as expressed in the ensuing claims.

I claim:

1. A coupling device comprising a continuously running first gear, a second gear, a coupling pinion associated with said first gear and adapted to be engaged with and disengaged from said second gear, a slidably mounted shaft for said pinion, a ratchet wheel provided with means for actuating said coupling pinion to place it in alternate coupling and non-coupling position with successive progressions of its ratchet teeth, an actuating pawl associated with said ratchet wheel, said means comprising a cam connected to said ratchet wheel having projections, a flat spring mounted to a base and normally bent away therefrom at a definite angle, the free end of said spring abutting against one end of the shaft of said pinion, the remaining end of said pinion being mounted against a resilient abutment, said spring being further provided with perforations adapted to engage said projections of said cam at alternate successive positions of said ratchet wheel.

2. A coupling device comprising a continuously running first gear, a second gear, a coupling pinion meshing with said first gear, a slidably mounted shaft for said pinion, a ratchet wheel provided with means for actuating said coupling pinion to place it in alternate coupling and non-coupling position with successive progressions of its ratchet teeth, an actuating pawl for said ratchet wheel, said means comprising a cam connected to said ratchet wheel and having spaced projections, a flat spring mounted upon a base and normally bent away therefrom at an angle, the free end of said spring abutting against one end of said shaft, the remaining end of said shaft being mounted against a resilient abutment, said spring being provided with perforations adapted to engage said projections of said cam at alternate positions of said ratchet wheel to effect engagement and disengagement of said pinion with said second gear.

3. A coupling device comprising a continuously running first gear, a second gear, a coupling pinion meshing with said first gear, a slidably mounted shaft for said pinion, a ratchet wheel having four teeth spaced at 90°, an actuating pawl for said ratchet wheel, a cam having a pair of diametrical projections spaced at 180° connected to said ratchet wheel, a flat spring mounted upon a base and normally bent away therefrom at an angle, said spring having two perforations spaced at 180° and adapted to engage said projections of said cam, the free end of said spring abutting against one end of said shaft, the remaining end of said shaft being mounted against a resilient abutment whereby by a first actuation of said pawl coupling between said first and second gears is effected and whereby by a subsequent second actuation of said pawl said gears become decoupled, a second cam connected to said ratchet fixedly related to said first cam, and a stop member connected to said second gear adapted to engage said second cam at a predetermined position and over a predetermined angular distance to cause said projections to engage said perforations for resetting said second gear to a predetermined initial starting position by a third actuation of said pawl.

4. A coupling device as claimed in claim 1, the end portion of said spring abutting against the end of said pinion shaft being constructed to have a greater flexibility than the main portion of said spring mounted to said base.

5. A coupling device as claimed in claim 1, the end portion of said spring abutting against the end of said pinion shaft being slotted to increase its flexibility as compared to the main part of said spring mounted to said base.

6. A coupling device comprising a continuously running driving gear; a driven gear; a slidably mounted coupling pinion meshing with said driven gear, means for alternately coupling said pinion with and decoupling it from said driving gear, said means comprising a flat spring secured to a base and normally bent away therefrom at a definite angle, the free end of said spring abutting against one end of said pinion, a resilient abutment member engaging the opposite end of said pinion; a cam having projections; said spring being provided with perforations adapted to engage said projections; and means for rotating said cam in successive angular steps to effect alternate engagement of said projections with and disengagement from the perforations of said spring to shift said pinion into and out of coupling position with said driving gear.

7. A coupling device comprising a continuously rotating driving member; a driven member; a slidably mounted coupling element in driving relation with said driven member; means for alternately engaging said element with and disengaging it from said driving member, said means comprising a flat spring secured to a base and normally bent away therefrom at a definite angle, the free end of said spring abutting against one end of said coupling element, a resilient abutment member engaging the opposite end of said coupling element; a cam having projections; said spring being provided with perforations adapted to engage said projections; and means for rotating said cam in successive angular steps by a uni-directional operating movement to effect alternate engagement of said projections with and disengagement from said perforations to shift said coupling element into and out of engagement with said driving member.

8. A coupling device comprising a continuously rotating driving member; a driven member; means for coupling said driven member with and decoupling it from said driving member, said means comprising a slidably mounted shaft for said driven member; a flat spring secured to a base and normally bent away therefrom at a definite angle, the free end of said spring abutting against one end of said shaft, a resilient abutment member engaging the opposite end of said shaft; a cam having projections; said spring being provided with perforations adapted to engage said projections; and means for rotating said cam in successive angular steps by a uni-directional operating movement to effect alternate engagement of said projections with and disengagement from the perforations of said spring to shift said driven member into and out of coupling position with said driving member.

9. A coupling device comprising a continuously rotating driving member; a driven member; a slidably mounted coupling element in driving relationship with said driven member; a cam having a pair of projections spaced at 180°; a flat spring secured to a base and normally bent away therefrom at a definite angle, said spring having a pair of perforations adapted to engage said projections of said cam, the free end of said spring abutting against one end of said coupling element, a resilient abutment member engaging the opposite end of said coupling element, said projections engaging the perforations of said cam in the normal starting position of said cam; and means for rotating said cam in angular successive steps of 90° each by a uni-directional operating movement, whereby at the first step of said cam said projections become disengaged from said perforations and coupling between said driving and driven members is effected and whereby at the second step of said cam said projections re-engage said perforations causing said members to become decoupled; a second cam connected to said first cam and having a projection; and an extension associated with said driven member adapted to engage the projection of said second cam when said driven member is in renewed driving relation at the third step of said first cam to return both said cams into the normal starting position.

DAVID PERLMAN.